May 28, 1946.  W. L. BARCLAY, JR  2,400,971
MOTOR CONTROL SYSTEM
Filed Jan. 14, 1944   2 Sheets-Sheet 1

WITNESSES:
INVENTOR
William L. Barclay, Jr.
BY
ATTORNEY

| Motoring Sequence Chart. | | | | | | | | | | | | Braking Sequence Chart. | | | | | | | | | | | |
|---|---|---|---|---|---|---|---|---|---|---|---|---|---|---|---|---|---|---|---|---|---|---|---|
| Cont. MC | Accel. A | PR1 | PR | 54 | 52 | 53 | 51 | G | M2 | M1 | LS | Cont. MC | Accel. A | B1 | B2 | M2 | 51 | 53 | 52 | 54 | PR | PR1 | BK |
| Sw. | 21' | | O | | | | | O | O | O | O | | 21' | O | O | | O | O | O | O | | | |
| Parallel | 21'-32' | O | O | | | | | | O | O | O | Off | 21' | O | O | | O | O | O | O | O | O | O |
| | 32'-33' | O | O | | | | | | O | O | O | | 22'-32' | O | O | | O | O | O | O | O | O | O |
| | 33'-32' | | | | | | | O | O | O | O | Variable Brk. Rates | 1 | O | O | | O | O | O | O | O | O | O |
| | 32'-29' | | | | | | O | O | O | O | O | | 2 | O | O | | O | O | | | O | O | O |
| | 29'-27' | | | | | O | O | O | O | O | O | | 3 | O | O | | | | | | O | O | O |
| | 27'-26' | | | | O | O | O | O | O | O | O | | 32'-33' | O | O | O | | | | | O | O | O |
| | 26'-21' | | | O | O | O | O | O | O | O | O | | 33'-21' | O | O | O | | | | | | | O |

Patented May 28, 1946

2,400,971

UNITED STATES PATENT OFFICE 2,400,971

MOTOR CONTROL SYSTEM

William L. Barclay, Jr., Pittsburgh, Pa., assignor to Westinghouse Electric Corporation, East Pittsburgh, Pa., a corporation of Pennsylvania Application January 14, 1944, Serial No. 518,220

10 Claims. (Cl. 172—179)

My invention relates, generally, to motor control systems and, more particularly, to systems for controlling the operation of the propelling motors of electric vehicles.

An object of my invention, generally stated, is to provide a control system for electrically propelled vehicles which shall be simple and efficient in operation and which may be economically manufactured and installed.

A more specific object of my invention is to provide a simplified and improved control system of the type described in Patents Nos. 2,078,684 and 2,254,911, issued April 27, 1937 and September 2, 1941, respectively, to L. G. Riley, and No. 2,318,331, issued May 4, 1943 to G. R. Purifoy, in which a motor-driven accelerator is utilized to control the acceleration and the deceleration of an electrically-propelled vehicle.

It has been found that under certain conditions of operation portions of the control equipment utilized in systems of the type described in the foregoing patents are subjected to excessive duty which may cause failure of the equipment, and a further object of my invention is to protect the equipment against such excessive duty.

Other objects of my invention will be explained fully hereinafter, or will be apparent to those skilled in the art.

In accordance with one embodiment of my invention, both the acceleration and the deceleration of an electrically-propelled vehicle are primarily controlled by a motor-driven accelerator of the type described in Patent No. 1,991,229, issued February 12, 1935 to L. G. Riley. In general, the accelerator is controlled in the manner described in the aforementioned Patents Nos. 2,078,684; 2,254,911; and 2,318,331. However, in the present system, the equipment is simplified and its operation improved in the manner hereinafter described.

For a fuller understanding of the nature and objects of my invention, reference may be had to the following detailed description, taken in conjunction with the accompanying drawings, in which.

Figure 1:
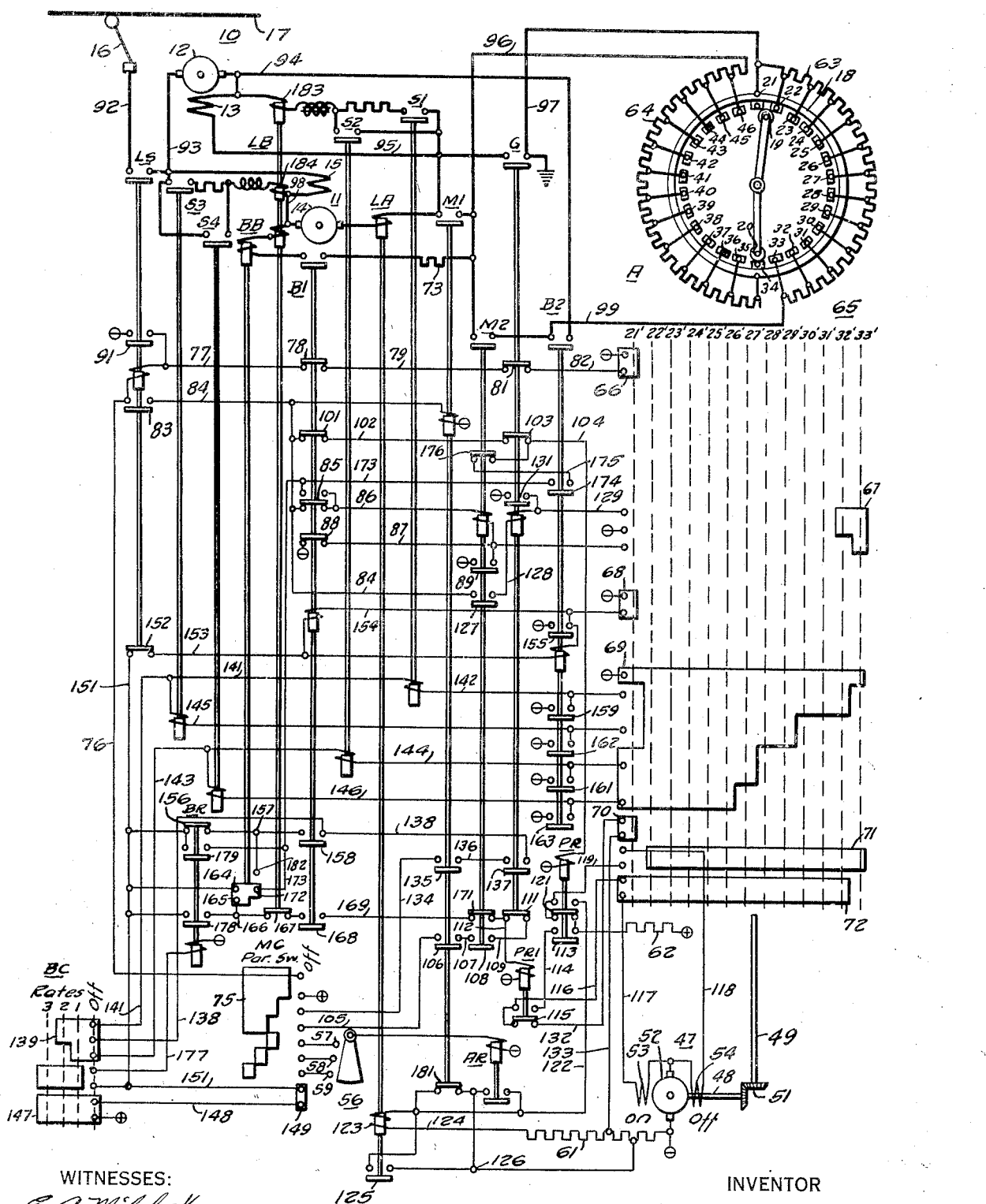
Figure 1 is a diagrammatic view of a control system embodying my invention.
Figures 2, 3:
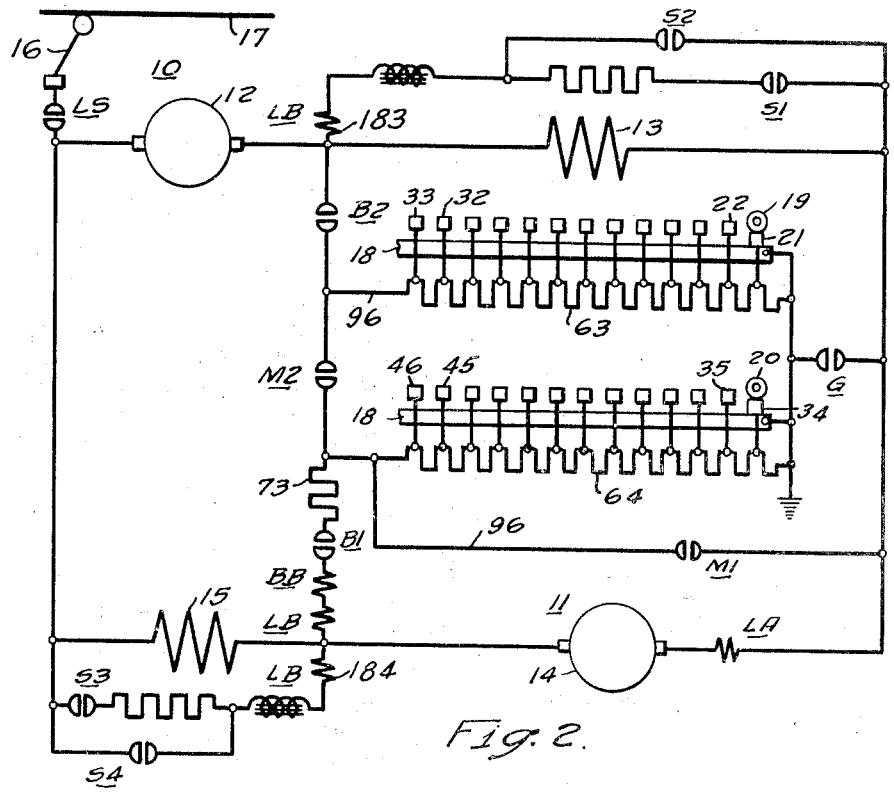
Fig. 2 is a schematic diagram showing the main circuit connections for the motors and control apparatus.
Fig. 3 is a chart, showing the sequence of operation of a portion of the apparatus illustrated in Figs. 1 and 2.

Referring to the drawings, a pair of electric motors 10 and 11 may be utilized for propelling a vehicle (not shown). The motor 10 is provided with an armature winding 12 and a series field winding 13. Likewise, the motor 11 is provided with an armature winding 14 and a series field winding 15. A line switch LS is provided for connecting the motors 10 and 11 to a trolley 16 which engages a trolley conductor 17 that may be energized from any suitable source of power, such as a generating station (not shown).

The motors 10 and 11 are connected in parallel circuit relation during acceleration of the vehicle, and they may also be connected for dynamic braking with the field winding 15 of motor 11 connected across the armature 12 of motor 10 and the field winding 13 of motor 10 connected across the armature 14 of motor 11, thereby permitting the current in the armature windings to reverse and cause the motors to act as generators and decelerate the vehicle. A pair of switches B1 and B2 are provided for establishing the dynamic braking connections.

Both the acceleration and the deceleration of the motors 10 and 11 are primarily controlled by a motor-driven accelerator A which is of the same general type as the one described in the aforementioned Patent No. 1,991,229. The accelerator A comprises a circular bus 18 inside of which are disposed a plurality of contact fingers 21 to 46, inclusive, which are progressively forced against the bus 18 by a pair of revolving rollers 19 and 20.

The rollers 19 and 20 are driven by a pilot motor 47 through shafts 48 and 49 connected by bevel gears 51. The pilot motor 47 is provided with an armature winding 52 and two field windings 53 and 54, one for each direction of rotation. An electrical braking or plugging circuit, which is fully described in Patent No. 2,078,649, issued April 27, 1937 to N. H. Willby, is provided for quick stopping of the motor 47 when it is de-energized. The pilot motor is controlled by a pair of relays PR and PR1, and may be energized from a suitable source of control potential, such as a battery (not shown).

The speed of the pilot motor 47 during acceleration is controlled by an accelerating relay AR, and also by a current limit relay LA which is responsive to the traction motor current. The actuating coil of the relay AR is energized through a retardation controller 56 which is an inertia or pendulum device that responds to acceleration and deceleration impulses, and is provided with contact members 57, 58 and 59 which are closed at predetermined settings.

The relay AR is energized at predetermined rates of acceleration, depending upon the position of a master controller MC. When the contact members of the relay AR are closed, a portion of a resistor 61, which is connected across the armature winding 52 of the pilot motor 47 when it is operating in the forward direction, is shunted, thereby reducing the speed of the pilot motor. The contact members of the current limit relay LA also shunt the resistor 61 in the event that the traction motor current becomes sufficient to operate the relay LA, thereby tending to maintain the accelerating current below a certain limit. A resistor 62 is connected in series with the pilot motor 47 for speed regulation of the motor.

The accelerator A is provided with resistors 63 and 64 for controlling the current in the motors 10 and 11. The resistor 63 is divided into a number of subdivisions which are connected to the contact fingers 21 to 33, inclusive, and the resistor 64 is divided into subdivisions which are connected to the contact fingers 34 to 46, inclusive. The resistors 63 and 64 are connected in the motor circuit in parallel-circuit relation during acceleration, and in series-circuit relation during dynamic braking.

As shown, the accelerator A is provided with a drum switch 65 having a plurality of contact segments 66 to 72, inclusive, and cooperating contact fingers which engage the contact segments as the accelerator is driven by the shaft 49. The reference numerals 21' to 33' indicate the contact fingers over which the roller 19 travels while the contact segments are engaged by their respective contact fingers. It will be seen that the roller 20 travels over contact fingers 34 to 46, while the roller 19 travels over the fingers 21 to 33.

In addition to the accelerator and its associated drum switch, numerous other switches are provided for performing certain switching operations. These include switches M1 and M2 for connecting the motors 10 and 11 to the resistors 63 and 64 during acceleration; a switch G for connecting one terminal of the motors directly to ground after the resistors 63 and 64 have been shunted from the motor circuit by the accelerator rollers; field shunting switches S1, S2, S3 and S4; and a braking relay BR which permits dynamic braking to be applied.

The energization of the relay BR is controlled by a braking controller BC which may also be utilized to control the air braking system (not shown). The controllers MC and BC are electrically interlocked to prevent improper operation of the equipment.

In addition to the current limit relay LA, which functions to limit the motor current during acceleration by regulating the operation of the accelerator A, a similar relay LB is provided for limiting the motor current during dynamic braking. A limit relay BB is also provided for controlling the operation of the pilot motor 47 during coasting of the vehicle.

As described in the aforementioned Patent No. 2,078,684, the dynamic braking switches are closed immediately whenever the traction motors are disconnected from the power source, thereby permitting a small braking current to circulate during the entire coasting period. The retardation produced by the small circulating current is negligible, and has no noticeable effect on the coasting characteristics of the vehicle. The time required for brake application and build-up is shortened by having the braking switches already closed, and by having available a stable voltage of considerable magnitude to cause the generated current to build up rapidly when it is desired to increase the braking effect.

The circulating current is held at a low value during coasting by utilizing the limit relay BB, which is set to operate at a low current, to control the operation of certain of the field shunting switches and to cause the pilot motor to advance or retract the accelerator in accordance with the car speed. In this manner, the accelerator is always in the correct position to properly control the motor current, and an immediate dynamic braking effect can be obtained by opening one or more of the field shunting switches to increase the excitation of the machines 10 and 11 which causes the generated current to increase, thereby increasing the braking effect.

With a view to enabling the operator of the vehicle to select different rates of dynamic braking, provision is made for controlling the operation of the field shunting switches S1, S2, S3 and S4 by means of the braking controller BC. In this manner, the operator may select a desired rate of braking by controlling the operation of the field shunting switches to vary the field excitation of the motors 10 and 11 during dynamic braking, thereby regulating the generated current. The limit relay LB, which controls the accelerator A during braking, is provided with additional coils which are energized by the current in the field shunting circuits in order that the relay will be calibrated for the different current values corresponding to the selected braking rates, thereby permitting the relay to control the accelerator to regulate the motor current over the entire braking range.

As described in the aforementioned Patent No. 2,318,331, the switch M2 is utilized to permit operation of the accelerator during coasting and braking, but to prevent its advancement while the vehicle is standing still. When the accelerator nears the end of its travel in a forward direction during either coasting or braking, the switch M2 is closed to shunt the accelerator resistors 63 and 64 from the motor circuit, and the accelerator is returned to its initial position.

However, a permanent braking resistor 73 remains connected in the traction motor circuit, and it has been found that under certain conditions of operation, sufficient voltage may be impressed across this resistor to cause its failure. For example, if the speed of the vehicle increases after its speed has decreased sufficiently during coasting to cause the accelerator to be fully advanced during the spotting operation and then returned to its initial position after the closing of the switch M2, in the manner hereinbefore described, the resistor 73 is the only resistance left in the motor circuit and it may be burnt out by the increased voltage resulting from the increase in motor speed.

In order to overcome this difficulty and prevent failure of the equipment, I provide for controlling the operation of the switch M2 by the spotting relay BB. The contact members of the relay BB are so connected in the control circuit that the switch M2 may be opened to reinsert the accelerator resistance back into the traction motor circuit whenever the circulating current exceeds the normal value, after the switch M2 has been closed to shunt the accelerator resistance. In this manner, the permanent braking resistance is protected against excessive voltage, and the accelerator is permitted to function in its normal manner during coasting.

In order that the functioning of the foregoing apparatus may be more closely understood, the operation of the system, particularly during coasting and dynamic braking, will be described in more detail.

Assuming that it is desired to accelerate the vehicle to the maximum speed, the master controller MC may be actuated to the parallel position, thereby applying power to the motors 10 and 11. When the controller MC is actuated to the parallel position, the switches LS, M1 and M2 are closed to connect the motors to the power source through the accelerator resistors 63 and 64. The energizing circuit for the actuating coil of the switch LS may be traced from positive through a segment 75 on the controller MC, conductor 76, the actuating coil of the switch LS, conductor 77, an interlock 78 on the switch B1, conductor 79, an interlock 81 on the switch G, conductor 82, and the segment 66 of the drum switch 65 to negative.

Following the closing of the switch LS, the actuating coil of the switch M1 is energized through a circuit which extends from the conductor 76 through an interlock 83 on the switch LS, conductor 84, and the actuating coil of the switch M1 to negative. At this time, the actuating coil of the switch M2 is energized through a circuit which extends from the conductor 84 through an interlock 85 on the switch B1, conductor 86, the actuating coil of the switch M2, conductor 87, and an interlock 88 on the switch B1 to negative.

Upon the closing of the switch M2, a holding circuit for the actuating coil of this switch is established through an interlock 89 on the switch M2. A holding circuit for the actuating coil of the switch LS is also established through an interlock 91 on the switch LS.

The closing of the switches LS, M1 and M2 connects the motors 10 and 11 in parallel-circuit relation. The circuit through the motor 10 extends from the trolley conductor 17 through the trolley 16, a power conductor 92, the switch LS, conductor 93, the armature winding 12 of the motor 10, conductor 94, the series field winding 13, conductor 95, the switch M1, conductor 96, either the accelerator resistor 64 and the bus 18 to a grounded conductor 97, or the switch M2, conductor 99, and the accelerator resistor 63 to the grounded conductor 97.

The circuit through the motor 11 extends from the conductor 93 through the series field winding 15, conductor 98, the armature winding 14, the actuating coil of the limit relay LA, conductor 95, the switch M1, conductor 96, either the switch M2, conductor 99, and the accelerator resistor 63 to the grounded conductor 97, or the accelerator resistor 64 to the grounded conductor 97.

Since it has been assumed that the controller MC is actuated to the parallel position for maximum acceleration, the relays PR and PR1 are energized to cause the pilot motor 47 to advance the accelerator rollers 19 and 20 to shunt the resistors 63 and 64 from the motor circuit. The energizing circuit for the actuating coil of the relay PR may be traced from the previously energized conductor 84 through an interlock 101 on the switch B1, conductor 102, an interlock 103 on the switch G, conductor 104 and the actuating coil of the relay PR to negative.

The energizing circuit for the actuating coil of the relay PR1 extends from the controller MC through conductor 105, an interlock 106 on the switch M1, conductor 107, an interlock 108 on the switch M2, conductor 109, an interlock 111 on the switch G, conductor 112 and the actuating coil of the relay PR1 to negative. The closing of the relays PR and PR1 energizes the pilot motor 47 to advance the accelerator A. The energizing circuit for the pilot motor may be traced from positive through the resistor 62, contact members 113 of the relay PR, conductor 114, contact members 115 of the relay PR1, conductor 116, the segment 72 of the drum switch 65, conductor 117, a field winding 53, and the armature winding 52 to negative.

As explained hereinbefore, the pilot motor advances the accelerator A under the control of the limit relay LA, the contact members of which are disposed to shunt a portion of the resistor 61 from the motor circuit, thereby regulating the operating speed of the pilot motor 47. When the contact members of the relay LA are open, the resistor 61 is connected across the armature winding 52 of the motor 47 through a circuit which extends from one terminal of the armature winding 52 through the field winding 54, conductor 118, the segment 71 of the drum switch 65, conductor 119, contact members 121 of the relay PR, conductor 122, a coil 123 of the relay LA, conductor 124, and the resistor 61 to negative.

When the contact members of the relay LA are closed, a major portion of the resistor 61 is shunted from the parallel circuit, thereby decreasing the armature current of the motor and reducing its speed. The shunt circuit may be traced from the conductor 122 through the contact members 125 of the relay LA, conductor 126, and a small portion of the resistor 61 to negative.

In this manner, the accelerator A is advanced to shunt the resistors 63 and 64 from the traction motor circuit, thereby accelerating the vehicle under the control of the limit relay LA. When the accelerator A nears the end of its travel in the forward direction, an energizing circuit is established for the actuating coil of the switch G, thereby closing this switch to connect one terminal of the motors 10 and 11 directly to ground. The energizing circuit for the actuating coil of the switch G may be traced from the previously energized conductor 84 through an interlock 127 on the switch M2, conductor 128, the actuating coil of the switch G, conductor 129, and the segment 67 of the drum switch 65 to negative. A holding circuit for the switch G is established through an interlock 131 carried by the switch G.

The closing of the switch G connects the motors 10 and 11 directly to ground through a circuit which extends from the conductor 95 through the switch G to the grounded conductor 97. The closing of the switch G also opens the interlocks 103 and 111 on this switch to deenergize the relays PR and PR1, thereby causing the pilot motor 47 to operate in the reverse direction to return the accelerator rollers 19 and 20 to the position shown in the drawings. The circuit for operating the motor 47 in the reverse direction may be traced from positive through the resistor 62, contact members 121 of the relay PR, conductor 119, the segment 71 of the drum switch 65, conductor 118, the off field winding 54, and the armature winding 52 to negative.

Provision is made for shunting the armature winding 52 of the motor 47 before the accelerator reaches the end of its travel, thereby slowing down the speed of the motor. The shunting circuit may be traced from one terminal of the armature winding 52 through the field winding 53, conductor 117, the segment 72, conductor 116, the contact members 115 of the relay PR1, conductor 132, the segment 70 of the switch 65, conductor 133, and a portion of the resistor 61 to negative. The drum switch segments 72, 71 and 70 function as limit switches to stop the pilot motor at the desired position by interrupting the energizing circuit, and also establishing an electrical braking circuit for the motor by shunting the armature winding through the parallel circuit just previously traced.

As the accelerator A is being returned toward its initial position, the field shunting switches S1, S2, S3 and S4 are closed to shunt the field winding of the traction motors, thereby causing them to operate at their maximum speed. The energizing circuit for the actuating coil of the switch S1 may be traced from the controller MC through conductor 134, an interlock 135 on the switch M1, conductor 136, an interlock 137 on the switch G, conductor 138, a segment 139 on the controller BC, conductor 141, the actuating coil of the switch S1, conductor 142, and the segment 69 of the drum switch 65 to negative.

The energizing circuit for the actuating coil of the switch S2 may be traced from the controller BC through conductor 143, the actuating coil of the switch S2, conductor 144, and the segment 69 to negative. The circuit for the coil of the switch S3 extends from the conductor 141 through the actuating coil of the switch S3, conductor 145, and the segment 69 to negative. The energizing circuit for the actuating coil of the switch S4 extends from the conductor 143 through the actuating coil of the switch S4, conductor 146, and the segment 69 to negative.

As shown, the closing of the switch S1, connects a combined reactance and resistance shunt across the field winding 13 of the motor 10. Likewise, the closing of the switch S3 connects a similar shunt across the field winding 15 of the motor 11. The closing of the switch S2 removes the resistor from the shunt circuit around the field winding 13, thereby further decreasing the field strength of motor 10. Likewise, the closing of the switch S4 removes the resistor from the shunt circuit for the field winding 15.

As explained hereinbefore, the pendulum device 56 functions to maintain a predetermined rate of acceleration by controlling the operation of the relay AR which, in turn, governs the operating speed of the pilot motor 47 while it is driving the rollers 19 and 20 to shunt the resistors 63 and 64 from the traction motor circuit. The relay AR and the limit relay LA both govern the speed of the pilot motor by establishing a shunt circuit around the armature of the pilot motor, as previously described.

Since it has been assumed that the controller MC is set for maximum acceleration, it is necessary for the pendulum device 56 to swing to a position in which it engages the contact member 59, in order to energize the relay AR. When the relay AR is energized, the closing of its contact members establishes a shunt circuit around the armature winding 52 of the pilot motor in the same manner as the relay LA, thereby reducing the speed of the pilot motor 47. In this manner, the pendulum device 56 functions to maintain a predetermined rate of acceleration, the rate being selected by the operator of the vehicle.

If it is desired to permit the vehicle to coast, the motors 10 and 11 may be disconnected from the power source by actuating the controller MC to the "off" position, thereby deenergizing the switches LS, M1, M2 and G. As explained hereinbefore, the braking switches B1 and B2 are closed immediately when the controller MC is actuated to the "off" position, thereby establishing the dynamic braking connections and causing a small current to circulate through the motors during coasting of the vehicle. However, the circulating current is of such a low value that it does not materially affect the coasting characteristics of the vehicle.

The energizing circuit for the actuating coil of the switch B1 may be traced from positive through a segment 147 on the controller BC, conductor 148, a segment 149 on the controller MC, conductor 151, an interlock 152 on the switch LS, conductor 153, the actuating coil of the switch B1, conductor 154, and the segment 68 on the drum switch 65 to negative. The energizing circuit for the actuating coil of the switch B2 extends from the conductor 153 through the coil of the switch B2, conductor 154, and the segment 68 to negative. A holding circuit for the switches B1 and B2 is established through an interlock 155 on the switch B2.

The closing of the switches B1 and B2 establishes dynamic braking connections for the motors 10 and 11, whereby the field winding 13 of the motor 10 is connected across the armature 14 of the motor 11, and the field winding 15 of the motor 11 is connected across the armature 12 of the motor 10, thereby causing the motors to function as generators which are driven by the momentum of the vehicle. However, the generated current is maintained at a small value by the action of the accelerator A which is under the control of the limit relay BB during coasting, the relay being set to operate at a relatively low value of current. Furthermore, the field shunting switches S1, S2, S3 and S4 are closed during coasting to weaken the field strength of the machines 10 and 11, thereby tending to maintain a low value of generated current.

The energizing circuit for the actuating coil of the switch S1 may be traced from the conductor 151, through contact members 156 of the relay BR, conductor 157, an interlock 158 on the switch B1, conductor 138, the segment 139 of the controller BC, conductor 141, the actuating coil of the switch S1, conductor 142, and an interlock 159 on the switch B2 to negative. The energizing circuit for the actuating coil of the switch S2 extends from the controller BC through conductor 143, the coil of the switch S2, conductor 144, and an interlock 161 on the switch B2 to negative. The circuit for the actuating coil of the switch S3 extends from the conductor 141 through the coil of the switch S3, conductor 145, and an interlock 162 on the switch B2 to negative. The circuit for the switch S4 extends from the conductor 143 through the actuating coil of the switch S4, conductor 146, and an interlock 163 on the switch B2 to negative.

Since the current generated by the machines 10 and 11 during coasting is proportional to the speed of the vehicle, this current may be utilized for spotting the accelerator A, that is, for matching the position of the accelerator with the speed of the vehicle, thereby insuring that the accelerator will be in the proper position to prevent an excessive rush of current in the event that dynamic braking is put into effect. As previously stated, the accelerator is under the control of the limit relay BB during coasting. This relay functions to control the operation of the relays PR and PR1 which control the direction of operation of the pilot motor 47. In this manner, the accelerator is either advanced or retracted as the vehicle loses or gains in speed.

As explained hereinbefore, the pilot motor 47 is operated in the forward direction when the relays PR and PR1 are both energized, and it is operated in the reverse direction when both relays are deenergized. Therefore, the pilot motor is controlled by the action of the relay BB which controls the energization of the relays PR and PR1 during coasting. When the relay BB is in its lowermost position, the relay PR1 is energized through a circuit which may be traced from the previously energized conductor 151 through contact members 164 and 165 of the relay BB, conductor 166, contact members 167 of the relay LB, an interlock 168 of the switch B1, conductor 169, an interlock 171 on the switch M2, conductor 112, and the actuating coil of the relay PR1 to negative.

The energizing circuit for the actuating coil of the relay PR may be traced from the conductor 151, through contact members 164 and 172 of the relay BB, conductor 173, an interlock 174 on the switch B2, conductor 175, interlock 176 on the switch M2, conductor 104, and the actuating coil of the relay PR to negative.

As shown, the contact members of the relay BB are so arranged that the relay functions to stop the pilot motor by deenergizing the relay PR1 in case a circulating current reaches a predetermined value. In the event that the circulating current continues to increase and exceeds a predetermined value, the relay BB functions to deenergize the relay PR as well as the relay PR1, thereby reversing the pilot motor 47. In this manner, the operation of the accelerator during coasting is so controlled that it is in the correct position to control the motor current in the event the dynamic braking action is required.

As explained hereinbefore, the switch M2 is closed in case the accelerator is fully advanced during spotting while the vehicle is coasting. The closing of the switch M2 shunts the accelerator resistors from the motor circuit, and permits the accelerator to be returned to its initial position.

However, it may be undesirable to permit the switch M2 to remain closed if the vehicle should gain in speed during the coasting operation. Therefore, the operation of the switch M2 is placed under the control of the limit relay BB, thereby causing the switch M2 to be reopened to insert the accelerator resistance back into the motor circuit whenever the circulating current exceeds the normal value after the switch M2 has closed to cut the accelerator out of the motor circuit.

The energizing circuit, which causes the switch M2 to be closed at the end of the accelerator travel, may be traced from the conductor 151, through contact members 164 and 172 of the relay BB, conductor 173, the interlock 85 on the switch B1, conductor 86, the actuating coil of the switch M2, conductor 87, and the segment 67 of the drum switch 65 to negative.

As previously explained, a holding circuit for the switch M2 is established through the interlock 89 carried by the switch M2. Since the energizing circuit for the switch M2 is established through the contact members of the relay BB, the actuating coil of the switch is deenergized in the event that the circulating current exceeds the setting of the relay BB, thereby causing the switch M2 to be reopened and the spotting operation continues under the control of the limit relay BB until the vehicle comes to rest, or until the full dynamic braking operation is established.

In the event that dynamic braking is required to decelerate the vehicle, the controller BC may be actuated to one of the braking positions, thereby energizing the relay BR which removes the accelerator A from the control of the limit relay BB, and places it under the control of the limit relay LB which is set for a higher current value. Therefore the relay LB permits the generated current to be increased, thereby increasing the dynamic braking action of the motors 10 and 11. The energizing circuit for the coil of the relay BR may be traced from the controller BC through conductor 177 and the actuating coil of the relay BR to negative.

The closing of the relay BR establishes shunt circuits around the contact members of the limit relay BB which previously controlled the energization of the relays PR and PR1. The one shunt circuit may be traced from the conductor 151 through contact members 178 of the relay BR to the conductor 166. The other shunt circuit may be traced from the conductor 151 through contact members 179 of the relay BR to the conductor 173.

In this manner, the operation of the pilot motor is placed under the control of the limit relay LB during dynamic braking. This relay functions to control the operation of the relay PR1 to stop the pilot motor in the event that the traction motor current exceeds a predetermined value.

Inasmuch as it is desirable to operate the pilot motor at a lower speed during dynamic braking, the speed of the pilot motor during braking is reduced by the closing of an interlock 181 on the switch M1 to shunt a major portion of the resistor 61 from the armature circuit of the pilot motor 47. This shunt circuit may be traced from one terminal of the armature 52 through a circuit previously traced to the conductor 122, thence through the interlock 181 to the conductor 126 and a portion of the resistor 61 to negative.

As explained hereinbefore, the dynamic braking rate may be controlled by the operator by actuating the controller BC to control the operation of the field shunting switches S1, S2, S3 and S4, thereby varying the field strength of the machines 10 and 11 to increase or decrease the generated current. Since the energizing circuits for the actuating coils of the switches S1, S2, S3 and S4 have been previously traced, it is believed to be unnecessary to trace these circuits at this time.

It will be seen that the contact members 156 of the relay BR, which is opened during dynamic braking, are paralleled by contact members 164 and 182 of the relay BB which are closed during braking, thereby permitting the energizing circuits for the field shunting switches to be established through the controller BC, as previously explained.

In order that the calibration of the limit relay LB may be changed in accordance with the variation in field strength obtained by means of the field shunting circuits, the relay is provided with coils 183 and 184 which are connected in the respective field shunting circuits for the machines 10 and 11. In this manner, the relay LB is recalibrated to permit the relay to properly control the accelerator at the required current values for the various rates of dynamic braking obtainable by the field shunting action.

It will be noted that the switch M2 is closed when the accelerator A has shunted the resistors 63 and 64 from the motor circuit during dynamic braking. The closing of the switch M2 establishes a shunt circuit around the resistors 63 and 64, thereby permitting the accelerator to be returned to its original position, in order that it will be in the correct position to permit power to be reapplied to the motors. The energizing circuit for the actuating coil of the switch M2 extends from the previously energized conductor 151 through the contact members 179 of the relay BR, conductor 173, the contact member 85 of the switch B1, conductor 86, the actuating coil of the switch M2, conductor 87, and the segment 67 of the drum switch 65 to negative. A holding circuit for the switch M2 is established through the interlock 89 on the switch M2.

The closing of the switch M2 interrupts the energizing circuits for the actuating coils of the relays PR and PR1, thereby causing the pilot motor to be operated in the reverse direction to return the accelerator to its original position, as hereinbefore explained. The switch M2 will remain closed so long as the braking controller BC is retained in a braking position. If the braking controller is returned to the "off" position while the vehicle is standing still, thereby deenergizing the relay BR, the actuating coil of the switch M2 continues to be energized through the contact members of the relay BB so long as the vehicle remains at a standstill. Therefore, the accelerator can not creep or advance from its initial position while the vehicle is standing still.

However, should the vehicle start moving, the limit relay BB functions to deenergize the actuating coil of the switch M2, in the manner hereinbefore explained, and the accelerator is then spotted under the control of the limit relay BB, as previously explained. In this manner, all of the accelerators in a multiple-unit train are kept in step, thereby insuring proper operation of the accelerators when power is applied to the train.

From the foregoing description, it is apparent that I have provided a control system which insures proper operation of the control equipment at all times during the operation of the vehicle controlled by the system. Furthermore, the equipment is protected from excessive duty which might result in failure of the equipment.

Since many modifications may be made in the apparatus and arrangement of parts without departing from the spirit of my invention, I do not wish to be limited other than by the scope of the appended claims.

I claim as my invention:

1. In a motor control system, in combination, a motor for propelling a vehicle, a power conductor, switching means for connecting the motor to the power conductor, switching means for establishing dynamic braking connections for the motor, said braking connections being established during coasting of the vehicle to permit a current to circulate through the motor, resistance-varying means for controlling the motor current during coasting, additional switching means for shunting the resistance-varying means from the motor circuit, and means responsive to the motor current for controlling the operation of said resistance-varying means and said additional switching means.

2. In a motor control system, in combination, a motor for propelling a vehicle, a power conductor, switching means for connecting the motor to the power conductor, switching means for establishing dynamic braking connections for the motor, said braking connections being established during coasting of the vehicle to permit a current to circulate through the motor, resistance-varying means for controlling the motor current during coasting, additional switching means for shunting the resistance-varying means from the motor circuit, and relay means responsive to the motor current for controlling the operation of both said resistance-varying means and said additional switching means.

3. In a motor control system, in combination, a motor for propelling a vehicle, a power conductor, switching means for connecting the motor to the power conductor, switching means for establishing dynamic braking connections for the motor, said braking connections being established during coasting of the vehicle to permit a current to circulate through the motor, resistance-varying means for controlling the motor current during coasting, additional switching means for shunting the resistance-varying means from the motor circuit, and relay means responsive to the motor current and having contact members operable in sequential relation for controlling the operation of said resistance-varying means and said additional switching means.

4. In a motor control system, in combination, a motor for propelling a vehicle, a power conductor, switching means for connecting the motor to the power conductor, switching means for establishing dynamic braking connections for the motor, said braking connections being established during coasting of the vehicle to permit a current to circulate through the motor, resistance-varying means for controlling the motor current during coasting, additional switching means for shunting the resistance-varying means from the motor circuit, switching means actuated by said resistance-varying means, and relay means responsive to the motor current and cooperating with said last-named switching means to control said additional switching means.

5. In a motor control system, in combination, a motor for propelling a vehicle, a power conductor, switching means for connecting the motor to the power conductor, switching means for establishing dynamic braking connections for the motor, said braking connections being established during coasting of the vehicle to permit a current to circulate through the motor, resistance-varying means for controlling the motor current during coasting, additional switching means for shunting the resistance-varying means from the motor circuit, switching means actuated by said resistance-varying means, and relay means responsive to the motor current for controlling the operation of said resistance-varying means and cooperating with said last-named switching means to control said additional switching means.

6. In a motor control system, in combination, a motor for propelling a vehicle, means for connecting the motor to a power conductor, switching means for establishing dynamic braking connections for the motor, said braking connections being established when the motor is disconnected from the power conductor to permit a current to circulate through the motor during coasting, a variable resistance accelerator for controlling the motor current, means for driving the accelerator, additional switching means for shunting the accelerator from the motor circuit, and means responsive to the motor current for controlling the operation of said driving means and said additional switching means.

7. In a motor control system, in combination, a motor for propelling a vehicle, means for connecting the motor to a power conductor, switching means for establishing dynamic braking connections for the motor, said braking connections being established when the motor is disconnected from the power conductor to permit a current to circulate through the motor during coasting, a variable resistance accelerator for controlling the motor current, means for driving the accelerator, additional switching means for shunting the accelerator from the motor circuit, and relay means responsive to said circulating current for controlling the operation of both said driving means and said additional switching means.

8. In a motor control system, in combination, a motor for propelling a vehicle, means for connecting the motor to a power conductor, switching means for establishing dynamic braking connections for the motor, said braking connections being established when the motor is disconnected from the power conductor to permit a current to circulate through the motor during coasting, a variable resistance accelerator for controlling the motor current, means for driving the accelerator, additional switching means for shunting the accelerator from the motor circuit, and relay means responsive to said circulating current and having contact members operable in sequential relation for controlling the operation of said driving means and said additional switching means.

9. In a motor control system, in combination, a motor for propelling a vehicle, means for connecting the motor to a power conductor, switching means for establishing dynamic braking connections for the motor, said braking connections being established when the motor is disconnected from the power conductor to permit a current to circulate through the motor during coasting, a variable resistance accelerator for controlling the motor current, means for driving the accelerator, additional switching means for shunting the accelerator from the motor circuit, switching means actuated by said driving means, and relay means responsive to the circulating current and cooperating with said last-named switching means to control said additional switching means.

10. In a motor control system, in combination, a motor for propelling a vehicle, means for connecting the motor to a power conductor, switching means for establishing dynamic braking connections for the motor, said braking connections being established when the motor is disconnected from the power conductor to permit a current to circulate through the motor during coasting, a variable resistance accelerator for controlling the motor current, means for driving the accelerator, additional switching means for shunting the accelerator from the motor circuit, switching means actuated by said driving means, interlocking means actuated by said first-named switching, and relay means responsive to the circulating current for controlling the operation of said driving means and cooperating with said interlocking means and said last-named switching means to control said additional switching means.

WILLIAM L. BARCLAY, Jr.